United States Patent [19]

Whiteman et al.

[11] Patent Number: 6,086,967
[45] Date of Patent: Jul. 11, 2000

[54] MODIFIED ATMOSPHERE FILMS USEFUL IN THE PACKAGING OF PERISHABLE FOOD

[75] Inventors: Nicole F. Whiteman; Gina L. Young; Jeffrey J. Wooster, all of Lake Jackson, Tex.

[73] Assignee: The Dow Chemical Company, Midland, Mich.

[21] Appl. No.: 08/744,548

[22] Filed: Nov. 6, 1996

[51] Int. Cl.[7] .................. B32B 7/02; C08J 5/18; C08L 23/04
[52] U.S. Cl. .................. 428/35.7; 206/524.1; 206/524.6; 426/127; 428/34.9; 428/35.2; 428/35.5; 428/515; 525/53; 525/240; 526/943
[58] Field of Search .................. 428/34.9, 35.2, 428/35.5, 35.7, 36.92, 515; 426/118, 129, 392, 395, 410, 415, 127; 206/524.1, 524.6; 525/240, 53; 526/943

[56] References Cited

U.S. PATENT DOCUMENTS

| | | |
|---|---|---|
| 5,139,855 | 8/1992 | Fujitani et al. .................. 428/215 |
| 5,206,075 | 4/1993 | Hodgson, Jr. .................. 428/216 |
| 5,236,963 | 8/1993 | Jacoby et al. .................. 521/92 |
| 5,322,726 | 6/1994 | Dew .................. 428/216 |
| 5,358,792 | 10/1994 | Mehta et al. .................. 428/516 |
| 5,360,648 | 11/1994 | Falla et al. .................. 428/35.2 |
| 5,389,448 | 2/1995 | Schirmer et al. .................. 428/517 |
| 5,419,934 | 5/1995 | Wilson .................. 428/35.7 |
| 5,427,807 | 6/1995 | Chum et al. .................. 426/393 |
| 5,491,019 | 2/1996 | Kuo .................. 428/213 |
| 5,508,051 | 4/1996 | Falla et al. .................. 426/392 |
| 5,562,958 | 10/1996 | Walton et al. .................. 428/34.9 |
| 5,591,390 | 1/1997 | Walton et al. .................. 264/456 |
| 5,594,071 | 1/1997 | Takahashi et al. .................. 525/240 |
| 5,595,705 | 1/1997 | Walton et al. .................. 264/456 |
| 5,614,315 | 3/1997 | Kondo et al. .................. 428/332 |
| 5,638,660 | 6/1997 | Kuo .................. 53/449 |
| 5,674,945 | 10/1997 | Takahashi et al. .................. 525/240 |
| 5,677,383 | 10/1997 | Chum et al. .................. 525/240 |
| 5,685,128 | 11/1997 | Chum et al. .................. 53/441 |

FOREIGN PATENT DOCUMENTS

| | | | |
|---|---|---|---|
| 2106889 | 9/1993 | Canada .................. | B32B 027/08 |
| 588667 A2 | 9/1993 | European Pat. Off. ........ | B32B 27/32 |
| 0687558 | 12/1995 | European Pat. Off. ........ | B32B 27/32 |
| 92/02580 | 2/1992 | WIPO .................. | C08K 7/22 |
| 92/14784 | 9/1992 | WIPO .................. | C08L 23/08 |
| 9214784 | 9/1992 | WIPO .................. | C08L 23/08 |
| 9308221 | 4/1993 | WIPO .................. | C08F 10/00 |
| 9409060 | 4/1994 | WIPO .................. | C08J 5/18 |
| 9508441 | 3/1995 | WIPO .................. | B32B 27/32 |
| 95/26269 | 10/1995 | WIPO .................. | B32B 27/32 |

OTHER PUBLICATIONS

Gunderson, J.J. et al, "Characterization of Polyethylene/Polyproprylene Blends".
International Search Report dated Feb. 19, 1998 issued by the EPO acting as the International Searching Authority in PCT/US97/18909.
Japanese abstract No. 09183871.
Japanese abstract No. 09143315.
Z. H. Stachurski et al., "Particle Coarsening in Polypropylene/Polyethylene Blend", *Macromolecules* 1996, pp. 2131–2137, 1996.
S. P. Chum et al., "Insite™ Technology Based Polyolefin Elastomers For Impact Modification", SPO'93, pp. 247–269.
J. J. Gunderson et al., "Characterization of Polyethylene/Polypropylene Blends", pp. 393–394.

Primary Examiner—Ellis Robinson
Assistant Examiner—Sandra M. Nolan

[57] ABSTRACT

The subject invention pertains to a film structure suitable for the packaging of perishable food, comprising at least one film layer which in turn comprises a blend of at least one homogeneous linear or substantially linear ethylene polymer and at least one polypropylene polymer, wherein the film structure is characterized as having a 2% secant modulus which is at least 8% greater than a comparable film structure prepared without the polypropylene polymer, an oxygen transmission rate of at least 700 cc(at STP)-mil/100 in.$^2$-day-atm at 25° C. The inventive film structures exhibit an optimized balance of properties, making them especially useful in modified atmosphere packages for perishable goods. The inventive films are particularly suited for the packaging of fresh fruits, vegetables, and other perishable items which would benefit from controlled access to environmental oxygen.

22 Claims, 1 Drawing Sheet

MODIFIED ATMOSPHERE FILMS USEFUL IN THE PACKAGING OF PERISHABLE FOOD

CROSS-REFERENCE TO RELATED APPLICATIONS

This application is related to U.S. patent application Ser. No. 08/455,176, filed May 31, 1995 in the names of P. S. Chum and N. F. Whiteman, which was a divisional of U.S. patent application Ser. No. 08/054,334, filed on Apr. 28, 1993, which issued as U.S. Pat. No. 5,427,807, which was a continuation-in-part of U.S. patent application Ser. No. 07/76,130, filed on Oct. 15, 1991, which issued as U.S. Pat. No. 5,272,236; and U.S. patent application Ser. No. 08/397,280, filed Mar. 13, 1995 in the names of H. C. Silvis, D. J. Murray, T. R. Fiske, S. R. Betso, and R. R. Turley, which was a continuation-in-part of U.S. patent application Ser. No. 08/045,330, filed Apr. 8, 1993 and a continuation-in-part of U.S. patent application Ser. No. 07/945,034, filed Sep. 15, 1992, all of which are incorporated herein by reference.

BACKGROUND OF THE INVENTION

This invention relates to means for packaging perishable food. In particular, this invention relates to means for packaging perishable food in a modified atmosphere package. More particularly, this invention relates to packaging food with a modified atmosphere package having at least one film layer comprising a blend of a homogeneous linear or substantially linear ethylene polymer and a polypropylene homopolymer or copolymer.

In the modern distribution and marketing of food products, a multitude of differer packaging materials are used. One principal category of food packaging materials is plastic film. Many kinds of plastic film exist, which differ both in composition and structure, with some being tailored to specific applications and with others are more generic in nature.

Different types of produce packaging are illustrated in the following examples. Bulk carrots sold in bunches directly from a shipping crate are considered to be "unpackaged" although it is recognized that they must be contained in some type of box crate for shipment. Lettuce that is loosely wrapped in a protective film would be considered to be to be minimally packaged because, although some degree of protection provided by the wrap, the package can breathe freely and the lettuce can be contaminated fairly easily. A mixture of cleaned and ready-to-eat iceberg lettuce, carrots, and cabbage in a sealed bag is an example of fresh-cut produce contained in a modified atmosphere package.

Modified atmosphere packaging systems are packaging systems which maintain an environment surrounding the perishable item which slows spoilage. Many bulkproduce items that have historically been shipped and sold unpackaged or minimally packaged can benefit from proper containment in a modified atmosphere package. Modified atmosphere packaging films serve to extend shelf-life, and thus reduce the amount of discarded produce, improve quality by slowing produce aging and by reducing exposure to bacteria, and promoting convenience to the consumer due to the availability of high quality pre-cut produce.

Modified atmosphere packaging works to extend the life of fresh-cut produce by reducing the respiration rate and associated aging of the produce. After produce is picked it continues to live and breathe, or respire. During this time the produce consumes oxygen and gives off carbon dioxide. This is the opposite of photosynthesis, during which plants consume carbon dioxide and give off oxygen. One reaction, of many, that occurs during the respiration process is the conversion of glucose and oxygen to water and carbon dioxide:

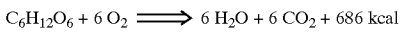

$$C_6H_{12}O_6 + 6\, O_2 \Longrightarrow 6\, H_2O + 6\, CO_2 + 686\, kcal$$

To reduce the respiration rate of the produce, one can reduce the concentration of oxygen in the package and/or increase the concentration of carbon dioxide in the package When the fresh-cut produce is exposed to an environment in which the oxygen concentration has been reduced, the respiration and aging of the produce is also reduced. This extends the usable shelf-life of the produce and improves the quality of the produce. However, while the oxygen concentration in the package should be reduced, it should not be eliminated, as such would lead to anaerobic respiration and rapid spoilage. For this reason, high barrier packages, which prevent most transmission of oxygen and other gases are generally not suitable for long term packaging of living fresh-cut produce. Packages designed with selective barrier properties that effectively control oxygen transmission rates and the resulting oxygen concentration inside the package are the essence of modified atmosphere packaging used for fresh-cut produce Increased carbon dioxide concentration may also reduce the respiration rate of the produce. For certain foods carbon dioxide also inhibits the growth of certain microorganisms. Carbon dioxide acts as a fungicide for strawberries, for example. Some types of produce are sensitive to high concentrations of carbon dioxide, however. For example, iceberg lettuce may discolor if the carbon dioxide concentration exceeds about 2.5%.

In addition to oxygen and carbon dioxide concentration, there are many other factors that determine the rate at which the produce respires, e.g., temperature, the age an condition of the produce, water content, and ethylene concentration in the environment. In the case of temperature, many types of produce are stored at or below 40° F. to slow respiration and therefore slow aging. However, care must be taken not to expose the produce to temperatures that are below the temperature at which the produce will undergo irreversible damage.

In addition to food preservation properties, film and package fabricators, as well as the ultimate consumers, impose additional requirements. From the perspective of the fabricator, the packaging film must have the physical properties necessary for good machinability during the packaging process and good package integrity during distribution and display to prevent disruption of the modified atmosphere. A key property for good machinability is sufficient stiffness or modulus. Key properties for good package integrity are good heat seal performance and high tear, puncture, and impact resistance.

From the perspective of the consumer, exceptionally good optical properties in a packaging film are essential to enable the consumer to visually inspect packaged produce before purchasing it. Further, higher modulus films are easier to fabricate into packages and have greater appeal to the consumer than flimsy, soft packages.

While modified atmosphere packages are currently employed in the packaging of fresh-cut produce, none exhibits an optimal balance of the requisite performance attributes. Common plastics (e.g., oriented polypropylene, polystyrene, polyester), which meet optics and modulus criteria, have poor oxygen permeability rates, heat seal performance, and tear resistance. Other plastics which meet optics, permeability, and heat seal performance requirements, such as 18% VA ethylene vinyl acetate copolymers have poor machinability and low tear resistance.

Still other plastics which meet permeability rate, machinability, heat seal and tear resistance have insufficient optical properties (e.g., heterogeneous linear ethylene polymers, often referred to as "ULDPE" and "VLDPE").

In this regard, U.S. Pat. No. 5,139,855 discloses a stretch wrap which comprises a core layer and EVA skin layers. The core layer is a blend of 5–30 wt. % polypropylene and 70–95 wt. % of what the patent refers to as "VLDPE". U.S. Pat. No. 5,139,855 does not purport to obtain oxygen transmissive films. Moreover, the films disclosed lack the excellent optical properties which are critical for packaging fresh-cut produce and other perishable foods.

U.S. Pat. No. 5,389,448 discloses a multilayer packaging film having improved burn-through resistance, which is attributable to a film layer comprising from 20–80 weight percent polypropylene (preferably 40 or 60 weight percent polypropylene) and 80–20 weight percent of what the patent refers to as "VLDPE". Preferably, the VLDPE will have an $I_2$ of no more than 0.15 g/10 min. One preferred polypropylene is described as having a melt flow rate (ASTM D 1238, Condition 230/2.16) of from 0.6 to 0.8 g/10 min. Again, the films disclosed lack the excellent optical properties which are critical for packaging fresh-cut produce and other perishable foods.

High modulus polymers, such as polypropylene and styrene-butadiene copolymers provide stiffness, but even as thin layers in coextrusions they do not provide the high transmission rates obtainable with films made of polyolefin resins, such as high percent vinyl acetate ethylene-vinyl acetate copolymers (EVA) or homogeneous linear or substantially linear ethylene polymers. These high-stiffness polymers also have low tear resistance and poor sealability.

To improve machinability and heat seal performance, designers have used coextrusions which often decrease permeability rates of the film, as the lower permeability layer serves as a barrier. To increase permeability, designers have sometimes perforated films of high modulus materials. However, perforated films do not have sufficient selectivity to distinguish between oxygen and carbon dioxide molecules. Accordingly, perforated films sacrifice the excellent carbon dioxide/oxygen transmission ratio available with nonperforated films, since oxygen and carbon dioxide molecules transmit through the holes at closer to equal rates. Moreover, perforated films raise concerns regarding sanitation. An additional drawback to such processes is that the fabrication technology for coextruded films and/or laminated films and for perforation technology is relatively sophisticated, increasing the capital investment required to enter the film fabrication business.

In many fresh cut produce packaging applications, films must meet minimum requirements in terms of optics, sealability, modulus and abuse resistance. Additionally oxygen transmission requirements must be met which vary for different types of produce. With current technologies, lower-than-desired-modulus films are often used to achieve critical transmission rates for high respiring produce, and lower modulus means poorer performance on form/fill/seal equipment and poorer consumer appeal. Unless costly and often undesirable perforation techniques are used, current technologies provide a limited level of oxygen transmission at any given modulus and a limited modulus at any given oxygen transmission rate. For instance, using currently available technology, to obtain oxygen transmission rates greater than 1000 cc(at STP)-mil/100 sq.in.-day requires the use of film having a modulus which is insufficient to be preferred for use in vertical form/fill/seal applications (unless often undesirable perforation techniques are employed) Such low modulus films are disadvantageous for use in vertical form/fill/seal machines, a they tend to bunch up around the forming collar or other parts of such machines, resulting in deformed or improperly sealed packages. Such low modulus films have limited consumer appeal, due to their flimsy nature.

Industry would find great advantage in a modified atmosphere package which exhibits good oxygen transmission, high modulus, and good optical properties. Industry would find particularly great advantage in a modified atmosphere package which further exhibits good heat seal performance and high tear, puncture, and impact resistance.

SUMMARY OF THE INVENTION

Accordingly, the subject invention provides a film structure suitable for the form/fill/seal packaging of perishable food, comprising at least one film layer which in turn comprises a blend of:

(a) from 80 to 95 weight percent of at least one homogeneous linear or substantially linear ethylene polymer which is characterized as having:
   (i) a density of from 0.89 to 0.90 g/cm$^3$
   (ii) a molecular weight distribution, Mw/Mn≦3
   (iii) a single melting peak, as determined by differential scanning calorimetry, and
   (iv) a melt index, $I_2$ of from 0.5 to 6.0 g/10 minutes; and (b) from 5 to 20 weight percent of at least one polypropylene polymer which is a homopolymer or copolymer comprising from 93 to 100 weight percent propylene and 0 to 7 weight percent ethylene, and having a melt flow rate of 6.0 to 25 g/10 min.; and (c) optionally, one or more additives selected from the group consisting of slip, antiblock, polymer processing aid, antifog, antistat, and roll release, which, in total, are present in the blend in an amount less than 10 weight percent;

wherein the film structure is characterized as having a 2% secant modulus which is at least 8% greater than a comparable film structure prepared without component (b), an oxygen transmission rate of at least 700 cc(at STP)-mil/100 in.$^2$-day-atm at 25° C., and wherein the film exhibits at least 25% greater oxygen transmission rate than a film of a homogeneous linear or substantially linear ethylene polymer which has the same 2% secant modulus as the blend of (a) and (b).

In another embodiment, the subject invention provides a highly oxygen transmissive film structure suitable for the packaging of perishable food, comprising at least one film layer which in turn comprises a blend of:

(a) from 70 to 95 weight percent of at least one homogeneous linear or substantially linear ethylene polymer which is characterized as having:
   (i) a density of from 0.86 to 0.89 g/cm$^3$
   (ii) a molecular weight distribution, Mw/Mn≦3
   (iii) a single melting peak, as determined by differential scanning calorimetry, and
   (iv) a melt index, $I_2$, of from 0.5 to 6.0 g/10 minutes; and (b) from 5 to 30 weight percent of at least one polypropylene polymer which is a homopolymer or copolymer comprising from 93 to 100 weight percent propylene and 0 to 7 weight percent ethylene, and having a melt flow rate as of from 6.0 to 25 g/10 min.; and (c) optionally, one or more additives selected from the group consisting of slip, antiblock, polymer processing aid, antifog, antistat, and roll release, which, in total, are present in the blend in an amount less than 10 weight percent;

wherein the film structure is characterized as having a 2% secant modulus which is at least 8% greater than a comparable film structure prepared without component (b), an oxygen transmission rate of at least 1000 cc(at STP)-mil/100 in²-day-atm at 25° C., and wherein the film exhibits at least 25% greater oxygen transmission rate than a film of a homogeneous linear or substantially linear ethylene polymer which has the same 2% secant modulus as the blend of (a) and (b).

Another aspect of this invention is a film structure suitable for the packaging of perishable food, comprising at least one film layer which in turn comprises a blend of:

(a) from 80 to 95 weight percent of a homogeneous linear or substantially linear ethylene polymer which is characterized as having:
 (i) a density of from 0.89 to 0.90 g/cm³
 (ii) a molecular weight distribution, $M_w/M_n$, $\leq 3$
 (iii) a single melting peak, as determined by differential scanning calorimetry, and
 (iv) a melt index, $I_2$, of from 0.5 to 6.0 g/10 minutes; and (b) at least one thermoplastic polymer which has a 2% secant modulus of at least 100,000 psi.; and (c) optionally, one or more additives selected from the group consisting of slip, anti-block, polymer processing aid, anti-fog, anti-stat, and roll release, which, in total, are present in the blend in an amount less than 10 weight percent;

wherein the film structure is characterized as having a 2% secant modulus which is at least 8% greater than a comparable film structure prepared without component (b), an oxygen transmission rate of at least 700 cc(at STP)-mil/100 in²-day-atm at 25° C., and wherein the film exhibits at least 25% greater oxygen transmission rate than a film of a homogeneous linear or substantially linear ethylene polymer which has the same 2% secant modulus as the blend of (a) and (b).

The films of the invention allow for higher modulus at higher oxygen transmission rates, while maintaining acceptable optics, sealability, and abuse resistance. Further, while the films of the invention may include coextruded and/or laminated films, very good performance is obtained by a less expensive monolayer construction.

BRIEF DESCRIPTIONS OF THE DRAWING

FIG. 1 is a plot of oxygen transmission rate versus 2% secant modulus for film structures comprising various SLEP's, various heterogeneous linear ethylene polymers, various ethylene vinyl acetate copolymers, and two blends which form film structures of the invention.

TEST PROCEDURES

Unless indicated otherwise, the following testing procedures are to be employed, each of which is incorporated herein by reference:

Density is measured in accordance with ASTM D-792. The samples are annealed at ambient conditions for 24 hours before the measurement is taken.

Gradient density is measured in accordance with ASTM D-1505.

Melt index ($I_2$), (measured in the case of the homogeneous linear or substantially linear ethylene polymers) is measured in accordance with ASTM D-1238, condition 190° C./2.16 kg (formally known as "Condition (E)").

Melt flow rate (measured in the case of the polypropylene polymers) is measured in accordance with ASTM D-1238, condition 230° C./2.16 kg (formally known as "Condition (L)").

Molecular weight is determined using gel permeation chromatography (GPC) on a Waters 150° C. high temperature chromatographic unit equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 mL/min. and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in Journal of Polymer Science, Polymer Letters, Vol. 6, (621) 1968, incorporated herein by reference) to derive the following equation:

$$M_{polyethylene} = a*(M_{polystyrene})^b.$$

In this equation, a=0.4316 and b=1.0. Weight average molecular weight, $M_w$, is calculated in the usual manner according to the following formula: $M_w = \Sigma w_i * M_i$, where $w_i$ and $M_i$ are the weight fraction and molecular weight, respectively, of the ith fraction eluting from the GPC column.

Haze is measured in accordance with ASTM D1003.

20° and 45° gloss are measured in accordance with ASTM D2457.

2% secant modulus is measured in accordance with ASTM D882. When only a single value is reported (or is included in an appended claim), it refers to the value in the machine direction.

Oxygen transmission rate is measured in accordance with ASTM D-3985-81, using an actual oxygen concentration of 1 percent in the test cell, and normalizing transmission values to 100 percent oxygen concentration.

Elmendorf tear (method B) is measured in accordance with ASTM D1922.

Film puncture values are obtained using an Instron tensiometer equipped with a strain cell and an integrated digital display that provides force determinations. A single ply of the film having a thickness of 2 mils (0.051 mm) is mounted taut between the two halves of a circular holder constructed of aluminum and machined to couple the halves securely when they are joined together. The exposed film area when mounted in the holder is 4 inches (10.2 cm) in diameter. The holder is then affixed to the upper stationary jaw of the tensiometer. To the lower jaw of the tensiometer which is set to traverse upwardly, a hemispherical aluminum probe having a 12.5 mm diameter is affixed. The probe is aligned to traverse upwards through the center of the mounted film at a deformation rate of 250 mm/min. The force required to rupture the film is taken from the digital display and divided by the film thickness and the diameter of the probe to provide puncture resistance in kg-cm/cc.

Dart impact (A, B) is measured in accordance with ASTM D-1709.

DETAILED DESCRIPTION

Figure 1:
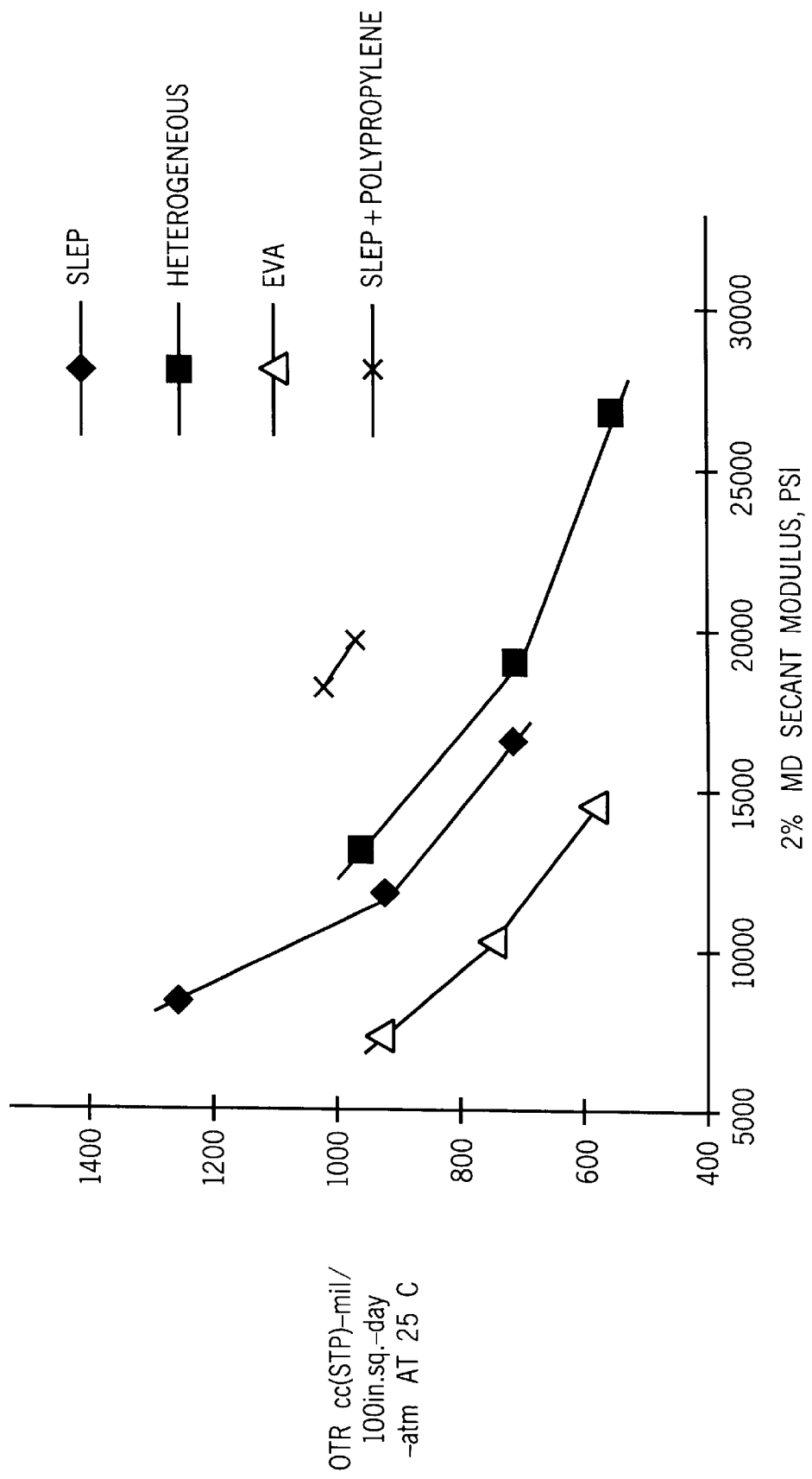

The modified atmosphere packaging films of the invention comprise at least one film layer, which in turn comprises a blend of from 80–95 weight percent of homogeneous linear or substantially linear ethylene/α-olefin interpolymer having a density of from 0.89 to 0.90 g/cm³ and a melt index ($I_2$) of from 0.5 to 6.0 g/10 min., with from 5 to 20 weight percent of a polypropylene polymer which is a polypropylene homopolymer or a copolymer of polypropylene with up to 7 weight percent ethylene, which polypropylene polymer has a melt flow rate of 6.0 to 25 g/10 min.

In particularly preferred embodiments, the film will comprise at least one film layer, which in turn comprises a blend of from 80–90 weight percent, more preferably from 85–90 weight percent of homogeneous linear or substantially linear ethylene/α-olefin interpolymer having a density of from 0.89 to 0.90 g/cm$^3$ and a melt index ($I_2$) of from 1.0 to 3.0 g/10 min., with from 10 to 20, more preferably from 10 to 15 weight percent of a polypropylene polymer which is a polypropylene homopolymer or a copolymer of propylene with up to 7 weight percent ethylene, which polypropylene polymer has a melt flow rate of from 8.0–15.0 g/10 min.

In each case, with respect to the homogeneous linear or substantially linear ethylene/α-olefin interpolymer will be an interpolymer of ethylene with at least one $C_3$–$C_{20}$ α-olefin. Preferred of the $C_3$–$C_{20}$ α-olefins include propene, isobutylene, 1-butene, 1-hexene, 4-methyl-1-pentene, and 1-octene, with $C_6$–$C_8$ α-olefins being most preferred.

These blends, when fabricated into 2 mil blown films, will preferably have the following performance properties, as determined by the test methods set forth above:

| | |
|---|---|
| Haze | <3% |
| 20° and 45° Gloss | >80 |
| 2% secant modulus | 10,000 to 30,000 psi |
| Oxygen transmission rate | >700 cc-mil/100 in$^2$-day-atm |
| Elmendorf tear (method B) | >400 g |
| Puncture | >150 ft-lb/in$^3$ |
| Dart Impact (A) | >600 g |

Concerning the Homogeneous Linear or Substantially Linear Ethylene Polymers

By way of definition, as used herein, "interpolymer" means a polymer of two or more comonomers, e.g. a copolymer, terpolymer, etc.

The homogeneous linear or substantially linear polymer is an ethylene polymer prepared using a single site catalyst. By the term homogenous, it is meant that any comonomer is randomly distributed within a given interpolymer molecule and substantially all of the interpolymer molecules have the same ethylene/comonomer ratio within that interpolymer. The DSC melting peak of homogeneous linear and substantially linear ethylene polymers will broaden as the density decreases and/or as the number average molecular weight decreases. However, unlike heterogeneous polymers, when a homogeneous polymer has a melting peak greater than 115° C. (such as is the case of polymers having a density greater than 0.940 g/cm$^3$), such polymer do not additionally have a distinct lower temperature melting peak.

Further, the homogeneous linear or substantially linear ethylene polymers will lack a measurable high density fraction, (i.e. short chain branching distribution as measured by Temperature Rising Elution Fractionation which is described in U.S. Pat. No. 5,089,321, and which is incorporated in its entirety into and made a part of this application), e.g. they will not contain any polymer fraction that has a degree of branching less than or equal to 2 methyl/1000 carbons.

The homogeneous linear or substantially linear ethylene polymers are characterized as having a narrow molecular weight distribution ($M_w/M_n$). For the linear and substantially linear ethylene polymers, the $M_w/M_n$ is from 1.5 to 3.0, preferably from 1.8 to 2.2.

The distribution of comonomer branches for the homogeneous linear and substantially linear ethylene polymers is characterized by its SCBDI (Short Chain Branch Distribution Index) or CDBI (Composition Distribution Branch Index) and is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, by Wild et al., *Journal of Polymer Science Poly. Phys. Ed.*, Vol. 20, p. 441 (1982), or in U.S. Pat. No. 4,798,081, both disclosures of which are incorporated herein by reference. The SCBDI or CDBI for the substantially linear polymers useful in the film structures of the present invention is preferably greater than about 50 percent, especially greater than about 70 percent, more preferably greater than about 90 percent.

Homogeneous linear ethylene/α-olefin interpolymers may be prepared using polymerization processes (e.g., as described by Elston in U.S. Pat. No. 3,645,992, the disclosure of which is incorporated herein by reference) which provide a homogeneous short chain branching distribution. In his polymerization process, Elston uses soluble vanadium catalyst systems to make such polymers. However, others such as Mitsui Petrochemical Company and Exxon Chemical Company have used so-called single site catalyst systems to make polymers having a homogeneous linear structure. Homogeneous linear ethylene/α-olefin interpolymers are currently available from Mitsui Petrochemical Company under the tradename "Tafmer" and from Exxon Chemical Company under the tradename "Exact".

In contrast to homogeneous linear ethylene polymers (which have fewer than 0.01 long chain branches per 1000 carbons), substantially linear ethylene polymers are homogeneous polymers having long chain branching. In particular, as used herein, "substantially linear" means that the polymer backbone is substituted with about 0.01 long-chain branches/1000 carbons to about 3 long-chain branches/1000 carbons, preferably from about 0.01 long-chain branches/1000 carbons to about 1 long-chain branch/1000 carbons, and more preferably from about 0.05 long-chain branches/1000 carbons to about 1 long-chain branch/1000 carbons. Long-chain branching is here defined as a chain length of at least about 6 carbon atoms, above which the length cannot be distinguished using $^{13}C$ nuclear magnetic resonance spectroscopy. The long chain branches have the same comonomer distribution as the polymer backbone and can be as long as about the same length as the length of the polymer backbone.

The substantially linear ethylene polymers used in the construction of the film structures of this invention are known, and they and their method of preparation are fully described in U.S. Pat. Nos. 5,272,236 and 5,278,272, both of which are incorporated in their entirety into and made a part of this application.

Methods for determining the amount of long chain branching present, both qualitatively and quantitatively, are known in the art. For qualitative methods for determination, see, e.g., U.S. Pat. Nos. 5,272,236 and 5,278,272, the disclosures of both of which are incorporated herein by reference, which disclose the use of an apparent shear stress vs. apparent shear rate plot to identify melt fracture phenomena.

The "rheological processing index" (PI) is the apparent viscosity (in kpoise) of a polymer measured by a gas extrusion rheometer (GER). The gas extrusion rheometer is described by M. Shida, R. N. Shroff and L. V. Cancio in *Polymer Engineering Science*, Vol. 17, No. 11, p. 770 (1977), and in "Rheometers for Molten Plastics" by John Dealy, published by Van Nostrand Reinhold Co. (1982) on pp. 97–99, both publications of which are incorporated by reference herein in their entirety. GER experiments are performed at temperature of 190° C., at nitrogen pressures between 250 to 5500 psig using about a 7.54 cm diameter, 20:1 L/D die with an entrance angle of 180°. For the substantially linear ethylene polymers useful herein, the PI is the apparent viscosity (in kpoise) of a material measured by GER at an apparent shear stress of $2.15 \times 10^6$ dyne/cm$^2$. The substantially linear ethylene polymers useful herein preferably have a PI in the range of about 0.01 kpoise to about 50 kpoise, preferably about 15 kpoise or less. The substantially linear ethylene polymers useful herein have a PI less than or equal to about 70% of the PI of a comparative linear ethylene polymer (either a Ziegler polymerized polymer or a linear uniformly branched polymer as described by Elston in U.S. Pat. No. 3,645,992) at about the same $I_2$ and $M_w/M_n$.

Substantially linear ethylene polymers will further be characterized as having a resistance to melt fracture. An apparent shear stress versus apparent shear rate plot is used to identify the melt fracture phenomena. According to Ramamurthy in the *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." The onset of surface melt fracture (OSMF) is characterized at the beginning of losing extrudate gloss at which the surface roughness of the extrudate can only be detected by 40× magnification. The critical shear rate at the onset of surface melt fracture for the substantially linear ethylene interpolymers and homopolymers is at least 50 percent greater than the critical shear rate at the onset of surface melt fracture of a comparative linear ethylene polymer (either a Ziegler polymerized polymer or a linear uniformly branched polymer as described by Elston in U.S. Pat. No. 3,645,992) having about the same $I_2$ and $M_w/M_n$.

Gross melt fracture occurs at unsteady extrusion flow conditions and ranges in detail from regular (alternating rough and smooth, helical, etc.) to random distortions. For commercial acceptability, (e.g., in blown films and bags therefrom), surface defects should be minimal, if not absent, for good film quality and properties. The critical shear stress at the onset of gross melt fracture for the substantially linear ethylene polymers used in making the film structures of the present invention is greater than about $4 \times 10^6$ dynes/cm$^2$. The critical shear rate at the onset of surface melt fracture (OSMF) and the onset of gross melt fracture (OGMF) will be used herein based on the changes of surface roughness and configurations of the extrudates extruded by a GER.

For quantitative methods for determining the presence of long chain branching, see, e.g., U.S. Pat. Nos. 5,272,236 and 5,278,272; Randall (Rev. Macromol. Chem. Phys., C29 (2&3), p. 285–297), which discusses the measurement of long chain branching using 13C nuclear magnetic resonance spectroscopy, Zimm, G. H. and Stockmayer, W. H., J. Chem. Phys., 17, 1301 (1949); and Rudin, A., Modern Methods of Polymer Characterization, John Wiley & Sons, New York (1991) pp. 103–112, which discuss the use of gel permeation chromatography coupled with a low angle laser light scattering detector (GPC-LALLS) and gel permeation chromatography coupled with a differential viscometer detector (GPC-DV). Each of the these references is incorporated herein by reference.

The substantially linear ethylene polymers will be characterized as having an $I_{10}/I_2$ (ASTM D-1238), is greater than or equal to 5.63, and is preferably from about 6.5 to 15, more preferably from about 7 to 10. The molecular weight distribution ($M_w/M_n$), measured by gel permeation chromatography (GPC), is defined by the equation:

$$M_w/M_n \leq (I_{10}/I_2) - 4.63,$$

and is preferably between about 1.5 and 2.5. For the substantially linear ethylene polymers, the $I_{10}/I_2$ ratio indicates the degree of long-chain branching, i.e. the larger the $I_{10}/I_2$ ratio, the more long-chain branching in the polymer.

Substantially linear ethylene polymers have a highly unexpected flow property, where the $I_{10}/I_2$ value of the polymer is essentially independent of the polydispersity index (i.e., $M_w/M_n$) of the polymer. This is contrasted with conventional linear homogeneously branched and linear heterogeneously branched polyethylene resins having Theological properties such that to increase the $I_{10}/I_2$ value the polydispersity index must also be increased.

The homogeneous linear or substantially linear ethylene polymer may be suitable prepared using a constrained geometry metal complex, such as are disclosed in U.S. application Ser. No. 545,403, filed Jul. 3, 1990 (EP-A-416,815); U.S. application Ser. No. 702,475, filed May 20, 1991 (EP-A-514,828); as well as U.S. Pat. Nos. 5,470,993, 5,374,696, 5,231,106, 5,055,438, 5,057,475, 5,096,867, 5,064,802, and 5,132,380. In U.S. Pat. No. 720,041, filed Jun. 24, 1991, (EP-A-514,828) certain borane derivatives the foregoing constrained geometry catalysts are disclosed and a method for their preparation taught and claimed. In U.S. Pat. No. 5,453,410 combinations of cationic constraine geometry catalysts with an alumoxane were disclosed as suitable olefin polymerization catalysts. For the teachings contained therein, the aforementioned pending United States Patent applications, issued United States Patents and published European Patent Applications are incorporated herein by reference.

Concerning the Polypropylene

The polypropylene used in the film structures of the invention is generally in the isotactic form of homopolymer polypropylene, although other forms of polypropylene can also be used (e.g., syndiotactic polypropylene). Polypropylene impact copolymers (e.g., those wherein a secondary copolymerization step reacting ethylene with the propylene is employed) and random copolymers (also reactor modified and usually containing 1.5 to 7 weight percent ethylene copolymerized with the propylene), however, can alternatively be used. A complete discussion of various polypropylene polymers is contained in Modern Plastics Encyclopedia/89, mid October 1988 Issue, Volume 65, Number 11, pp. 86–92, the entire disclosure of which is incorporated herein by reference. The molecular weight of the polypropylene for use in the present invention is conveniently indicated using a melt flow measurement according to ASTM D-1238, Condition 230° C./2.16 kg (formerly known as "Condition (L)" and also known as $I_2$). Melt flow rate is inversely proportional to the molecular weight of the polymer. Thus, the higher the molecular weight, the lower the melt flow rate, although the relationship is not linear. The melt flow rate for the polypropylene useful herein is generally from about 6.0 to 25 g/10 min., preferably from about 8 to 15 g/10 min.

Good clarity is achieved when the homogeneous linear or substantially linear ethylene/a-olefin polymer has a refractive index within 0.005 refractive index units from the refractive index of the polypropylene polymer, especially within 0.002 refractive index: units typically measured at 589 nm. Generally, polypropylene has a refractive index from about 1.470 to about 1.515, e.g., clarified polypropylene homopolymer has a refractive index of about 1.5065 and clarified polypropylene random copolymer has a refractive index of about 1.5044 at 589 nm.

Refractive index is measured using an Abbe-3L Refractometer made by Milton Roy Company and operated at 589 nm (sodium "d" line). Samples are prepared for testing in the refractometer by injection molding the polymer in a BOY 30T injection molder to thickness of about 0.125 inches. The samples tested for physical properties are prepared in the same manner and also at a thickness of about 0.125 inches.

Chum, Silvis, and Kao, in the presentation entitled "INSITE Technology Based Polyolefiln Elastomers for Impact Modification", SPO '93, presented a plot of refractive index versus density for substantially linear ethylene polymers. From this, they derived the equations:

$$RI=0.69694(density)+0.87884$$

$$density=(RI-0.87884)/0.69694$$

where RI is the refractive index of the polymer. Accordingly, when it is desirable to use a clarified polypropylene random copolymer having a refractive index of about 1.5044, preferred homogeneous linear and substantially linear ethylene polymers will have a density of about 0.898 g/cm$^3$.

To promote clarity, the viscosity of the polypropylene polymer should be less than that of the homogeneous linear or substantially linear ethylene polymer. Viscosity is inversely proportional to the melt index (in the case of the homogeneous linear or substantially linear ethylene polymers) and to the melt flow rate (in the case of the .polypropylene polymer). An estimate for comparing polyethylene melt index to polypropylene melt flow rate is to divide the polypropylene melt flow rate by 4. Thus a polypropylene having a melt flow rate of 12 g/10 min. is somewhat like a polyethylene having a melt index of 3 g/10 min., in terms of its viscosity or flow behavior. Accordingly, using a polypropylene having a melt flow rate of 2 or 4 g/10 min. with an ethylene polymer having a melt index of 1.6 g/10 min. would result in a blend in which the higher viscosity component constitutes the minor component of the blend, and would therefore not be preferred for obtaining low haze and high clarity film structures. In contrast, using a polypropylene having a melt flow rate of 12 g/10 min. with an ethylene polymer having a melt index of 1.6 g/10 min. would result in a blend in which the lower viscosity component constitutes the lower viscosity component of the blend, leading to improved dispersion of the minor component in the dominant homogeneous linear or substantially linear ethylene polymer phase, and thus providing excellent optical properties.

To the extent that the blend includes an additive (c) and such additive (c) does not measurably increase the haze of the film structure, the film structure preferably has a haze of less than 3%.

When the blend includes an additive (c) which increases the haze of the film structure, the film structure preferably has a haze of less than 8%.

Alternativly, when the blend includes an additive (c) which increases the haze of the film structure, that increases is preferably no more than 10 haze units over that of a film structure prepared with the blend which coes not include the additive (c).

Concerning the Modified Atmosphere Film Structures

The modified atmosphere film structures may be either monolayer or multilayer film structures, with monolayer films being preferred in that they satisfy the performance criteria without the added expense of multilayer processing equipment. Regardless of whether a monolayer or multilayer film is utilized, such films may be prepared by a variety of processes which are well-known to those of skill in the art.

The modified atmosphere film structures may be made by conventional fabrication techniques, e.g. simple bubble extrusion, biaxial orientation processes (such as tenter frames or double bubble processes), simple cast/sheet extrusion, coextrusion, lamination, etc. Conventional simple bubble extrusion processes (also known as hot blown film processes) are described, for example, in *The Encyclopedia of Chemical Technology*, Kirk-Othmer, Third Edition, John Wiley & Sons, New York, 1981, Vol 16, pp. 416–417 and Vol. 18, pp. 191–192, the disclosures of which are incorporated herein by reference. Biaxial orientation film manufacturing processes such as described in the "double bubble" process of U.S. Pat. No. 3,456,044 (Pahlke), and the processes described in U.S. Pat. No. 4,352,849 (Mueller), U.S. Pat. Nos. 4,820,557 and 4,837,084 (both to Warren), U.S. Pat. No. 4,865,902 (Golike et al.), U.S. Pat. No. 4,927,708 (Herran et al.), U.S. Pat. No. 4.952,451 (Mueller), and U.S. Pat. Nos. 4,963,419 and 5,059,481 (both to Lustig et al.), the disclosures of which are incorporated herein by reference, can also be used to make the novel film structures of this invention. Biaxially oriented film structures can also be made by a tenter-frame technique, such as that used for oriented polypropylene.

Other multilayer film manufacturing techniques for food packaging applications are described in *Packaging Foods With Plastics* by Wilmer A. Jenkins and James P. Harrington (1991), pp. 19–27, and in "Coextrusion Basics" by Thomas I. Butler, *Film Extrusion Manual: Process, Materials, Properties*, pp. 31–80 (published by TAPPI Press (1992)) the disclosures of which are incorporated herein by reference.

In certain embodiments of this invention, e.g. stretch overwrap applications, at least one heat sealable, preferably hot tackable, outer layer (i.e., skin layer) of the film structure comprises the blend of the homogeneous linear or substantially linear ethylene polymer and the polypropylene polymer. This heat sealable outer layer can be coextrude with the other layer(s) or the heat sealable outer layer can be laminated onto another layer(s) in a secondary operation, such as that described in *Packaging Foods With Plastics* ibid, or that described in "Coextrusion For Barrier Packaging" by W. J. Schrenk and C. R Finch, *Society of Plastics Engineers RETEC Proceedings*, June 15–17 (1981), pp. 211–229, the disclosures of which are incorporated herein by reference. Although not require (or preferred) for this invention, should a multilayer film be desired, such may be obtain from a monolayer film which has been previously produced via tubular film (i.e., blown film techniques) or flat die (i.e. cast film) as described by K. R. Osborn and W. A. Jenki. in "Plastic Films, Technology and Packaging Applications" (Technomic Publishing Co. Inc. (1992)), the disclosures of which are incorporated herein by reference, wherein the sealant film must go through an additional post-extrusion step of adhesive or extrusion lamination to other packaging material layers. If the sealant film is a coextrusion of two or more layers (also described by Osborn and Jenkins), the film may still be laminated to additional layers of packaging materials, depending on the other physical requirements of the final packaging film. "Laminations vs. Coextrusions" by D. Dumbleton (*Converting Magazine*, September 1992), the disclosure of which is incorporated herein by reference, also discusses lamination versus coextrusion. Monolayer and coextruded films can also go through other post-extrusion techniques, such as a biaxial orientation process and irradiation. With respect to irradiation, this technique can also precede extrusion by irradiating the pellets from which the film is to be fabricated prior to feeding the pellets into the extruder, which increases the melt tension of the extruded polymer film and enhances processability.

In other embodiments of this invention, the modified atmosphere film structure will comprise a core layer, which in turn comprises a blend of a homogeneous linear or substantially linear ethylene polymer and a polypropylene polymer, as described herein. Film structures of this nature are prepared in the same manner as those noted above in which the film layer comprising the blend is a skin layer.

Extrusion coating is yet another technique for producing multilayer packaging materials. Similar to cast film, extrusion coating is a flat die technique. A sealant can be extrusion coated onto a substrate either in the form of a monolayer or a coextruded extrudate.

In those embodiments in which the skin layer comprises the blend of the homogeneous linear or substantially linear ethylene polymer and the polypropylene polymer, the other layers of the multilayer structure may include structural layers. These layers can be constructed from various materials, including blends of homogeneous linear or substantially linear ethylene polymers with polypropylene polymers, and some layers can be constructed of the same materials, e.g. some films can have the structure A/B/C/B/A. Representative, nonlimiting examples of the non-substantially linear ethylene materials are: polyethylene terephthalate (PET), ethylene/vinyl acetate (EVA) copolymers, ethylene/acrylic acid (EAA) copolymers, ethylene/methacrylic acid (EMAA) copolymers, LLDPE, HDPE, LDPE, graft-modified ethylene polymers (e.g. maleic anhydride grafted polyethylene), styrene-butadiene polymers (such as K-resins, available from Phillips Petroleum), etc. Generally, multilayer film structures comprise from 2 to about 7 layers.

The thickness of the multilayer structures is typically from about 1 mil to about 4 mils (total thickness). The sealant layer, if present, varies in thickness depending on whether it is produced via coextrusion or lamination of a monolayer or coextruded film to other packaging materials. In a coextrusion, the sealant layer is typically from about 0.1 to about 3 mils, preferably from about 0.4 to about 2 mils. In a laminated structure, the monolayer or coextruded sealant film layer is typically from about 0.5 to about 2 mils, preferably from about 1 to 2 mils. For a monolayer film, the thickness is typically between about 0.4 mil to about 4 mils, preferably between about 0.8 to about 2.5 mils.

The film structures of the invention can be made into packaging structures such as form-fill-seal structures or bag-in-box structures. For example, one such form-fill-seal operation is described in *Packaging Foods With Plastics*, ibid, pp. 78–83. Packages can also be formed from multilayer packaging roll stock by vertical or horizontal form-fill-see packaging and thermoform-fill-seal packaging, as described in "Packaging Machinery Operations: No. 8, Form-Fill-Sealing, A Self-Instructional Course" by C. G. Davis, *Packaging Machinery Manufacturers Institute* (April 1982); *The Wiley Encyclopedia of Packaging Technology* by M. Bakker (Editor), John Wiley & Sons (1986), pp. 334, 364–369; and *Packaging: An Introduction* by S. Sacharow and A. L. Brody, Harcourt Brace Javanovich Publications, Inc. (1987), pp.322–326. The disclosures of all of the preceding publications are incorporated herein by reference. A particularly useful device for form-fill-seal operations is the Hayssen Ultima Super CMB Vertical Form-Fill-Seal Machine. Other manufacturers of pouch thermoforming and evacuating equipment include Cryova and Koch. A process for making a pouch with a vertical form-fill-seal machine is described generally in U.S. Pat. Nos. 4,503,102 and 4,521,437, both of which are incorporated herein by reference. Film structures containing one or more layers comprising a substantially linear ethylene polymer are well suited for the packaging of potable water, wine, condiments, and similar food products in such form-fill-seal structures.

The film structure may also be in the form of a lid stock for an injection molded, blow molded or thermoformed tray.

In those film structures incorporating an antifogging agent, the core layer(s) preferably consists of a nonpolar, hydrophobic polymer, e.g. a substantially linear ethylene polymer. Antifogging agents are generally located in the skin layers of such a structure. These agents are hydrophilic materials that interact with water (either from the atmosphere relative to the skin layer most removed from the wrapped food, or from the food by way of evaporation relative to the skin layer in contact with the food) such that water droplet do not form on the surface of the skin layer (thus "fogging" the film). This fogging, particularly on the skin layer in contact with the food, results in reduced product visibility and shelf life, and thus reduced commercial value.

In those structures with a core layer having a polar, hydrophilic nature, e.g. a core layer comprising EAA or EVA, the antifogging agent tends to migrate toward it. This depletes the concentration of antifogging agent at the exposed surfaces of the outer layers, and this in turn renders the film more susceptible to fogging. In multilayer film structures without a polar, hydrophilic core layer, the antifogging agent remains relatively dispersed throughout the outer layers.

Notwithstanding this disadvantage relative to antifogging agents, some food wrapping applications may be better served if the one or more of the core layers are constructed from a polar, hydrophilic material and the outer layers are constructed from a nonpolar, hydrophobic material. One example of such a film structure is substantially linear ethylene-polymer/EAA/substantially linear ethylene-polymer which is useful in wrapping retail-cut red meat and similar food products.

Other desirable properties of the plastic films used in this invention may include, depending on the nature of the other film layers in the structure, ease of fabrication and good oxygen permeability (particularly with respect to films made from such copolymers as EVA and EAA), dart impact, puncture resistance, tensile strength, low modulus, tear resistance, shrinkability, high clarity and a low affect on the taste and odor properties of the packaged food.

In addition to use in hermetically sealed modified atmosphere packages, the film structures of this invention may be employed in the stretch overwrap packaging of various fresh foods which benefit from access to environmental oxygen. These films are preferably prepared as nonshrink films (e.g., without biaxial orientation induced by double bubble processing) with good oxygen permeability, stretch, elastic recovery and hot tack characteristics, and can be made available to wholesalers and retailers in any convention, form, e.g. stock rolls, and used on all conventional equipment.

FIG. 1 is a plot of oxygen transmission rate versus 2% secant modulus for 2 mil. monolayer blown film structures comprising various SLEP's, various heterogeneous linear ethylene polymers, various ethylene vinyl acetate copolymers, and two blends which form film structures of the invention. Therein, the SLEP's employed were SLEP A and SLEP D, as described in the examples, as well as a SLEP having a density of 0.902 g/cm3 and a melt index (I2) of 1.0 g/10 min., available from The Dow Chemical Company. The heterogeneous linear ethylene polymers employed were Attane 4201, Attane 4213, Dowlex 2056A, all of which are available from The Dow Chemical Company. The EVA's employed contained 9%, 12% and 18% vinyl acetate-containing copolymers. The films structures of the invention, comprising the blends of SLEP and polypropylene were blends of SLEP A, as described in the examples, with 10 and 15 weight percent Profax SR-549M, respectively. As shown in FIG. 1, the films of the invention have a 2% secant modulus which is at least 8% greater than a comparable film structure prepared without component (b), and an oxygen transmission rate of at least 700 cc(at STP)-mil/100 in.$^2$-day-atm at 25° C., and mil/100 in.$^2$-day-atm at 25° C., and the film exhibits at least 25% greater oxygen transmission rate than a film of a homogeneous linear or substantially linear ethylene polymer which has the same 2% secant modulus as the blend of (a) and (b).

The film structures of this invention and their use in modified atmosphere packages are more fully described by the following examples. Unless indicated to the contrary, all parts and percentages are by weight.

EXAMPLES

The following polymers were utilized in the films of the invention and in the films of the comparative examples. In the case of the substantially linear ethylene polymers (SLEP), such polymers were prepared in accordance with the procedures of U.S. Pat. Nos. 5,272,236 and 5,278,272, incorporated herein by reference.

|  | Polymer type | Density (g/cm$^3$) | I$_2$ (g/10 min.) | I$_{10}$/I$_2$ | Melt flow rate | additives |
| --- | --- | --- | --- | --- | --- | --- |
| SLEP A | SLEP | 0.8965 | 1.6 | 10.1 |  | 500 ppm Irganox 1076, 800 ppm PEPQ |
| SLEP B | SLEP | 0.910 | 3.0 | 8.5 |  | same * |
| SLEP C | SLEP | 0.885 | 1.0 | — |  | same * |
| SLEP D | SLEP | 0.909 | 1.0 | 10.0 |  | same * |
| SLEP E | SLEP | 0.898 | 2.7 | 8.7 |  | same * |
| Profax 6331 | PP--homopolymer | 0.9 |  |  | 12 | unknown |
| Profax SR549M | PP--copolymer | 0.9 |  |  | 12 | unknown |
| Profax 6523 | PP--homopolymer | 0.9 |  |  | 4 | unknown |
| Profax SV-256M | PP--copolymer | 0.9 |  |  | 2 | unknown |
| Exact 4015 | HLEP | 0.895 | 1.5 | 5.6 |  | unknown |

Note: SLEP indicates substantially linear ethylene/l-octene copolymer
PP indicates polypropylene
HLEP indicates homogeneous linear ethylene polymer
PEPQ refers to (tetrakis(2,4-di-t-butylphenyl)-4,4'-biphenylene diphosphonite) (available from Clariant Corporation).
*"Same" means the additive package was as employed in SLEP A.

Polymer blends are formed either by melt blending or dry blending of the individual components. In the case of melt blending the polymers are first mixed and then extruded in a compounding extruder in order to obtain pellets that contain a combination of the materials. In dry blending, pellets of the different materials are mixed together and then added directly to the extruder used to manufacture the film. Optionally, additional additives such as slip, anti-block, and polymer process aid can be incorporated in either the melt blends or dry blends.

Example 1

Several screening experiments were done on a lab-scale blown film line (2" extruder, 3" die) to assess the suitability of different combinations of the substantially linear ethylene polymer and the polypropylene polymer. The results of these experiments were used to determine the necessary polypropylene melt flow rate and % polypropylene compositions to be evaluated on larger scale equipment.

Two-mil films were made of SLEP A and of a blend of 80 weight percent SLEP A with 20 weight percent Profax 6523 polypropylene on a 2" Egan blown film line using the conditions set forth below:

Melt temperature: 425 F
Frost Line Height: 10 inches
Output rate: 29–33 lb/hour
Die Size: 3" diameter
Die gap: 70 mil
Extruder size: 2" diameter
Screw type: modified LDPE single-flighted screw
Blow-Up Ratio: 2.5:1
Thickness: 2 mil Haze for the 2 mil films was 1.04+/−0.12 for the SLEP A film and 5.42+/−0.06 for the blend. The relatively high haze value for the films formed of the blend was attributable to the fact that the melt flow rate of the polypropylene polymer was not at least 4 times greater than the melt index of the SLEP.

Example Two

Additional 2-mil films were formed in accordance with the process and conditions set forth in Comparative Example 1, except that a barrier screw (as opposed to a single-flighted screw) was used in the extruder. In the first set of examples, Profax 6331 (12 MFR) and Profax SR-549M (12 MFR) were blended into SLEP A at 0, 10, 15, and 20 weight percent polypropylene. In the second set of examples, Profax 6331 and Profax SR-549M were blended into SLEP E. The haze of the film formed from the SLEP A polymer was slightly higher than reported in Example 1. The haze of the blends comprising the Profax 6331 homopolymer and the blends comprising the Profax SR-549M copolymer were similar to one another at equal ethylene polymer content. Note, however, that the haze of the 2 mil films based on SLEP E-based films were higher than the haze of the SLEP A-based films.

| Ethylene Polymer | Propylene Polymer | Haze |
| --- | --- | --- |
| 100% SLEP A |  | 1.63 +/− 0.28 |
| 90% SLEP A | 10% Profax SR-549M | 2.16 +/− 0.29 |
| 90% SLEP A | 10% Profax 6331 | 1.94 +/− 0.37 |
| 85% SLEP A | 15% Profax SR-549M | 2.62 +/− 0.96 |
| 85% SLEP A | 15% Profax 6331 | 2.27 +/− 0.19 |
| 80% SLEP A | 20% Profax SR-549M | 3.53 +/− 0.30 |
| 80% SLEP A | 20% Profax 6331 | 2.25 +/− 0.44 |
| 100% SLEP E |  | 3.03 +/− 0.30 |
| 90% SLEP E | 10% Profax SR-549M | 3.17 +/− 0.37 |
| 90% SLEP E | 10% Profax 6331 | 3.14 +/− 0.25 |
| 100% SLEP C |  | 1.33 +/− 0.17 |
| 90% SLEP C | 10% Profax SR-549M | 1.94 +/− 0.49 |
| 90% SLEP E | 10% Profax 6331 | 3.14 +/− 0.25 |

Additional films were prepared using the equipment and fabrication conditions set forth above in this Example, using SLEP C. Various physical properties of the resultant film structures are set forth in the previous and in the following table:

| | Clarity | Mod Dart A (g) | Dart A (g) | Dart B (g) | Grad Density | CD Elmendorf B (g) | MD Elmendorf B (g) | 20° Gloss | 45° Gloss | Puncture (ft-lb./in³) | CD 1% Secant Mod (psi) | CD 2% Secant Mod (psi) | MD 1% Secant Mod (psi) | MD 2% Secant Mod (psi) |
|---|---|---|---|---|---|---|---|---|---|---|---|---|---|---|
| SLEP C | 99.4 | >1350 | >850 | >850 | 0.8872 | 237 | 170 | 123 | 85.9 | 205 | 5319 | 4507 | 5248 | 5095 |
| 90% SLEP C, 10% SR549M | 99 | >1350 | >850 | >850 | 0.8872 | 339 | 310 | 116 | 83.1 | 207 | 7515 | 6564 | 9578 | 8429 |

As set forth in the previous table, the blend of SLEP C with Profax SR 549 M exhibited a 2% secant modulus which was 65% greater than that of the film structure which lacked the polypropylene polymer.

Example 3

Monolayer blown films were made of SLEP A and blends of SLEP A with Profax SV-256M polypropylene. These films were prepared on the Gloucester monolayer blown film line described below using the equipment and process conditions set forth below:

Equipment Description:

2.5" Gloucester extruder
6" Gloucester high back pressure die with dual lip air ring
Western Polymers Entrac dual iris
Gloucester bubble sizing cage
Gloucester single turret winder
Extrusion Parameters:
Temperature Profile.

Exturder: 250° F./270° F./360° F./360° F.
    measured melt temperature: 418° F.
    Connector Pipes: 430° F.
    Die: 450° F.
Other:

Output Rate: 120 pounds per hour
    Blow-Up Ratio: 2.5:1
    Layflat: 23.6 inches
    Take-Off rate: 56 feet per minute
    Film thickness: 2.0 mils Additionally, for some of the samples, 750 ppm oleamide slip, 2500 ppm diatomaceous earth antiblock, 1250 ppm calcium carbonate antiblock, and 2.3% low density polyethylene were added. The haze values for the resultant film structures is set forth in the following table. Note that the haze for SLEP A was the same for this experiment and for Example 1 prepared on the smaller lab-scale extrusion line.

| Ethylene Polymer | Polypropylene Polymer | Slip/ Antiblock | Haze |
|---|---|---|---|
| 100% SLEP A | | no | 1.09 +/− 0.06 |
| 90% SLEP A | 10% Profax SV-256M | no | 4.28 +/− 0.21 |

-continued

| Ethylene Polymer | Polypropylene Polymer | Slip/ Antiblock | Haze |
|---|---|---|---|
| 100% SLEP A | | yes | 3.68 +/− 0.06 |
| 95% SLEP A | 5% Profax SV-256M | yes | 5.67 +/− 0.11 |
| 90% SLEP A | 10% Profax SV-256M | yes | 6.67 +/− 0.13 |
| 85% SLEP A | 15% Profax SV-256M | yes | 8.04 +/− 0.22 |

Example 4

The films of Example 4 were prepared on a monolayer Gloucester blown film line using the conditions set forth above in Example 3. In these examples, the ratio of polypropylene to the substantially linear ethylene polymer was varied, and the use of alternate ethylene polymers was explored. In particular, a second substantially linear ethylene/1-octene copolymer was evaluated (SLEP D), as well as a homogeneous linear ethylene/1-butene copolymer (Exact 4015, available from Exxon Chemical Company). The polypropylenes employed were Profax 6331 homopolymer and Profax SR-549M copolymer. Alternate ethylene polymers used in comparative films included a heterogeneous linear ethylene polymer (Attane 4201 ultralow density linear polyethylene, available from The Dow Chemical Company), a high pressure polyethylene (LDPE 5011), a 4% vinyl acetate containing ethylene vinyl acetate copolymer (Escorene 312.09, available from Exxon Chemical Company), and KR-10 styrene-butadiene resin (hereinafter "K-Resin")(available from Phillips Petroleum). When slip and antiblock agents are indicated, 1250 ppm erucamide slip and 2500 ppm WhiteMist antiblock were employed.

The resultant films were evaluated for a variety of physical properties, which are set forth in the following table:

|  | SLEP A | 95 wt. % SLEP A w/ 5 wt. % Profax SR-549M | 90 wt. % SLEP A w/ 10 wt. % Profax SR-549M | 85 wt. % SLEP A w/ 15 wt. % Profax SR-549M | 90 wt. % SLEP A w/ 10 wt. % Profax SR-549M, slip and antiblock | 90 wt. % SLEP A w/ 10 wt. % Profax 6331 | SLEP D | SLEP D w/ slip and antiblock | ATTAN E 4201 | LDPE 5011 | EVA (4% VA) | 90 wt. % EXACT 4015 w/10% Profax SR-549M | K-Resin |
|---|---|---|---|---|---|---|---|---|---|---|---|---|---|
| Oxygen transmission rate (cc(at STP)-mil/100 in.$^2$-day-atm at 25° C.) | 1260 | 1234 | 1020 | 973 |  | 1127 | 732 |  | 779 | 490 | 593 | 1041 | 550 |
| Block(g) | 115 | 142 | 195 | 169 | 57.8 | 194 | 125 | 72.5 | 146 | 63 | 87.5 | 179 | 86 |
| Clarity | 100 | 99 | 99 | 99 | 93 | 99 | 100 | 95 | 99 | 90 | 98 | 99 | 96.8 |
| Dart A (g) |  |  |  |  |  |  |  |  |  | 92 |  |  | 838 |
| Dart B (g) | 850 | 850 | 850 | 850 | 850 | 850 | 850 | 850 | 850 |  | 195 | 850 | 414 |
| Film Density (g/cc) | 0.893 | 0.8972 | 0.8968 | 0.8969 | 0.9 | 0.8972 | 0.9066 | 0.9107 | 0.9104 | 0.9185 | 0.9242 | 0.896 | 0.95 |
| Elmendorf Tear B, CD | 485 | 489.6 | 621 | 711 | 468 | 521 | 698 | 496 | 981 | 371 | 249 | 194 | 25 |
| Elmendorf Tear B, MD (g) | 447 | 552 | 487 | 670 | 734 | 558 | 592 | 467 | 1149 | 366 | 274 | 254 | 26 |
| Gloss 20 | 140 | 127 | 135 | 121 | 90 | 129 | 135 | 98 | 91 | 61 | 110 | 117 | 112 |
| Gloss 45 | 91 | 87 | 90 | 88.5 | 81 | 89 | 88 | 79 | 72.4 | 72.6 | 84 | 88 | 103 |
| Haze (%) | 0.99 | 1.463 | 1.207 | 1.993 | 4.02 | 1.543 | 2.26 | 4.94 | 7.7 | 6.7 | 3.1 | 1.2 | 1.263 |
| Puncture (ft-lb/cu.in.) | 244 | 252 | 261 | 252 | 264 | 237 | 241 | 168 | 263 | 42 | 46 | 243 | 62 |
| 1% Secant Modulus, CD (psi) | 11434 | 13502 | 17065 | 20696 | 19217 | 15089 | 21960 | 22098 | 28026 | 33622 | 25343 | 13616 | 119500 |
| 2% Secant Modulus, CD (psi) | 9227 | 10715 | 13560 | 16389 | 14583 | 12391 | 16949 | 17559 | 21806 | 27147 | 20390 | 11360 | 99150 |
| 1% Secant Modulus, MD (psi) | 15779 | 15252 | 18909 | 25679 | 19199 | 20082 | 22453 | 22635 | 26073 | 31067 | 25826 | 15174 | 175700 |
| 2% Secant Modulus, MD (psi) | 11045 | 12009 | 15766 | 19579 | 14993 | 15578 | 16859 | 17794 | 20264 | 24700 | 20602 | 12832 | 156800 |
| Yield, CD (psi) | 620 | 709 | 831 | 923 | 833 | 795 | 941 | 1012 | 1207 | 1426 | 1216 | 684 | 2706 |
| Ultimate Tensile, CD (psi) | 6615 | 7237 | 7369 | 6824 | 3986 | 6694 | 7494 | 4475 | 6719 | 2805 | 3839 | 6478 | 5792 |
| Yield, MD (psi) | 627 | 758 | 898 | 991 | 882 | 804 | 952 | 1034 | 1254 | 1497 | 1229 | 737 | 3959 |
| Ultimate Tensile, MD (psi) | 6733 | 7223 | 7797 | 7699 | 5131 | 7567 | 8187 | 5760 | 6975 | 3169 | 4296 | 7123 | 4713 |

The film structures prepared using blends of SLEP A and the Exact 4015 homogeneous linear polymer are examples of the invention. It is noted that the film structures comprising blends of SLEP A with the polypropylene exhibit each of the preferred properties set forth above, i.e., haze less than 3%, 20° and 45° gloss of greater than 80, 2% secant modulus of from 10,000 to 30,000 psi, oxygen transmission of greater than 700 cc-mil/100 in$^2$-day-atm, Elmendorf tear of greater than 400 g, puncture greater than 150 ft-lb/in$^3$, dart impact (A) of greater than 600 grams, and heat seal initiation temperature of less than 190° F. Note, however, that while the film structures comprising the blend of the Exact 4015 with the polypropylene met nearly all of the performance criteria, it failed to meet the Elmendorf tear of greater than 400 g, making it somewhat less preferred, and indicating the benefit of octene as a comonomer over butene.

It is further noted that the film structure comprising the blend of 95 wt. % SLEP A w/5 wt. % Profax SR-549M exhibited a 2% secant modulus which was about 8% greater than that of the film structure comprising 100% SLEP. The film structure comprising the blend of 90 wt. % SLEP A w/10 wt. % Profax SR-549M exhibited a 2% secant modulus which was about 42% greater than that of the film structure comprising 100% SLEP. The film structure comprising the blend of 85 wt. % SLEP A w/15 wt. % Profax SR-549M exhibited a 2% secant modulus which was about 77% greater than that of the film structure comprising 100% SLEP.

Example 5

The film structures of the invention may be coextruded films in which the blend of the homogeneous linear or substantially linear ethylene polymer and the polypropylene polymer is utilized as a sealant layer. In these samples, the polypropylene employed was Profax SR-549M. The coextruded films were prepared using the equipment and the fabrication conditions:

COEXTRUDED BLOWN FILM

Three-layer coextruded blown films were prepared using the following equipment and conditions.

Equipment Description:

Layer A: 2.5" Egan extruder
Layer B: 2.5" Egan extruder
Layer C: 2.0" Egan extruder
Gloucester feedblock and 3-layer (A/B/C) coextrusion die, 8" diameter, 70 mil die gap
Sano dual lip air ring
Western Polymer iris
Sano bubble sizing cage and collapsing frame
Gloucester wind-up system Extrusion Parameters:

The following is an example of the operating conditions used (for the sample containing styrene-butadiene in the non-sealant layer and SLEP A in the seal layer and core layer):

Temperature Profile.

Extruder A: 275° F./300° F./350° F./350° F.
  measured melt temperature: 357° F.
Extruder B: 275° F./300° F./350° F./350° F.
  measured melt temperature: 375° F.
Extruder C: 335° F./350° F./365° F./365° F.
  measured melt temperature: 346° F.
Connector Pipes: 400° F.
Feedblock: 400° F.
Die: 400° F.

Other:

Output Rate: 200 pounds per hour
Blow-Up Ratio: 2.5:1
Layflat: 31.4 inches
Take-Off rate: 65 feet per minute
Film thickness: 2.0 mils Layer percentages and individual thicknesses:

| Extruder | Thickness | Material | Percentage |
|---|---|---|---|
| A | 0.3 mils | sealant | 15% |
| B | 1.5 mils | same as sealant | 75% |
| C | 0.2 mils | K-Resin | 10% |

Various physical properties were measured on the resultant films, which are set forth in the following table:

|  | K-Resin/Exact 4015 | K-Resin/SLEP A | K-Resin/SLEP A w/ 10% PP | K-Resin/Exact 4015 w/ 1500 ppm slip, 4000 ppm antiblock | K-Resin/SLEP A w/ 1500 ppm slip, 4000 ppm antiblock | K-Resin/SLEP A w/ 10% PP, 1500 ppm slip, 4000 ppm antiblock |
|---|---|---|---|---|---|---|
| Clarity | 98.5 | 99 | 98 | 96 | 96 | 94 |
| Dart A (g) | 658 | 530 | 510 | 563 | 558 | 368 |
| Dart B (g) | 412 | 336 | 384 | 384 | 390 | 376 |
| Density of the film, gradient (g/cc) | 0.908 | 0.9083 | 0.9085 | 0.9093 | 0.9107 | 0.9105 |
| Elmendorf B, CD (g) | 28 | 46 | 46 | 32 | 58 | 46 |
| Elmendorf B, MD (g) | 39 | 62.4 | 77 | 35 | 67 | 58 |
| Gloss 20 | 145 | 140 | 131 | 135 | 131 | 123 |
| Gloss 45 | 96 | 97 | 98 | 97 | 95 | 96 |
| Haze (%) | 2.2 | 1.7 | 1.5 | 2.1 | 3.1 | 3 |
| Puncture(ft-lb/cu.in.) | 179 | 112 | 103 | 128 | 84 | 84 |
| 1% Secant Modulus, CD (psi) | 20412 | 16833 | 27116 | 20888 | 21895 | 14436 |
| 2% Secant Modulus, CD (psi) | 15769 | 13982 | 21316 | 16423 | 17110 | 14771 |
| 1% Secant Modulus, MD (psi) | 21413 | 25613 | 36471 | 30912 | 30438 | 33779 |
| 2% Secant Modulus, MD (psi) | 18880 | 20812 | 30791 | 26663 | 26786 | 29881 |

-continued

|  | K-Resin/Exact 4015 | K-Resin/SLEP A | K-Resin/SLEP A w/ 10% PP | K-Resin/Exact 4015 w/ 1500 ppm slip, 4000 ppm antiblock | K-Resin/SLEP A w/ 1500 ppm slip, 4000 ppm antiblock | K-Resin/SLEP A w/ 10% PP, 1500 ppm slip, 4000 ppm antiblock |
|---|---|---|---|---|---|---|
| Yield, CD (psi) | 830 | 647 | 1017 | 848 | 797 | 909 |
| Ultimate Tensile, CD (psi) | 2979 | 2846 | 3410 | 3510 | 2932 | 3139 |
| Yield, MD (psi) | 903 | 923 | 1219 | 926 | 920 | 1135 |
| Ultimate Tensile, MD (psi) | 2946 | 2713 | 2555 | 3732 | 2571 | 2342 |

The coextrusion of K-Resin with SLEP A or Exact 4015 are examples of current technology. As set forth in the table, the coextruded films which include a layer comprising blends of the SLEP A with the polypropylene meet some of the criteria (gloss, haze, and modulus) of preferred films of the invention. However, they fail to meet the dart impact, puncture, and tear criteria of preferred film structures of the invention, and additionally possess the disadvantage of high fabrication cost (relative to monolayer films).

Example 6

Monolayer cast films were produced on the 3-layer coextrusion cast film line, using the same resins in all three layers of the extruder. The equipment and fabrication conditions employed are set forth below:

Equipment Description:

Extruder A: 2.5" diameter Egan extruder
Extruder B: 3.5" diameter Egan extruder
Extruder C: 2.0" diameter MPM extruder
Dow designed three-layer (A/B/C) coextrusion feedblock
30" Egan cast film die
Egan take-off system
Extrusion Parameters:

An example of the operating conditions used for the line is as follows

Equipment Description:

(these conditions used for SLEP A with 1250 ppm erucamide and 2500 ppm WhiteMist):
Extruder temperature profiles:

Extruder A: 300° F./450° F./512° F./512° F.
  screen changer & connector pipes: 512° F.
  measured melt temperature: 525° F.
Extruder B: 300° F./425° F./500° F./500° F./500° F./500° F./500° F. screen changer & connector pipes: 500° F. measured melt temperature 531° F.
Extruder C: 300° F./425° F./523° F./523° F.
  screen changer and connector pipes: 523° F.
  measured melt temperature 530° F.
Feedblock: 525° F.
Die: 525° F.

Other:

Total output rate: 287 pounds per hour
Take-off rate: 227 feet per minute
Film thickness: 2.0 mils
Layer percentages: 15/70/15 - all layers contained the same material
Layer thicknesses: 0.3 mils/1.4 mils/0.3 mils These examples demonstrate the utility of this invention in film structures made via a cast film process. Various performance criteria of the resultant films are set forth in the following table:

CAST FILMS OF SLEPs AND BLENDS WITH ADDITIVES*

|  | SLEP A w/ slip and antiblock | SLEP A w/ PP, slip and antiblock | SLEP B w/ slip and antiblock | SLEP B w/ PP, slip and antiblock | SLEP E w/ Slip and antiblock | SLEP E w/ PP, slip and antiblock |
|---|---|---|---|---|---|---|
| Gradient Density (g/cc) | 0.9059 | 0.8982 | 0.9082 | 0.9059 | 0.9011 | 0.8991 |
| Block (g) | 7.3 | 9.0 | 5.6 | 6.8 | 5.5 | 5.3 |
| Clarity | 89 | 93 | 92 | 95 | 91 | 95 |
| 20 Degree Gloss | 84 | 106 | 100 | 112 | 93 | 107 |
| 45 Degree Gloss | 83 | 86 | 83 | 86 | 84 | 87 |
| Haze(%) | 4.6 | 5.0 | 4.2 | 3.8 | 4.1 | 3.1 |
| Elm. Tear B, CD(g) | 568 | 758 | 821 | 758 | 717 | 721 |
| Elm. Tear B, MD(g) | 372 | 426 | 731 | 563 | 532 | 433 |
| Puncture(ft-lb/cu.in.) | 231 | 254 | 208 | 210 | 254 | 253 |
| 1% Sec. Mod. CD(psi) | 12098 | 18583 | 20589 | 17922 | 14754 | 14635 |
| 2% Sec. Mod. CD(psi) | 10184 | 14501 | 15916 | 16283 | 11469 | 12878 |
| 1% Sec. Mod. MD(psi) | 13045 | 18198 | 14624 | 23327 | 14203 | 19565 |
| 2% Sec. Mod. MD(psi) | 10443 | 15068 | 13645 | 20330 | 11413 | 16494 |
| Toughness, CD (ft-lb/cu.in.) | 708 | 957 | 952 | 982 | 882 | 975 |
| Toughness, MD (ft-lb/cu.in.) | 937 | 1090 | 1054 | 1062 | 996 | 1054 |
| Ultimate Tensile, CD(psi) | 3805 | 5151 | 4330 | 4277 | 4697 | 5051 |
| Ultimate Tensile, MD(psi) | 5917 | 6549 | 5283 | 5174 | 5872 | 5871 |

-continued

CAST FILMS OF SLEPs AND BLENDS WITH ADDITIVES*

|  | SLEP A w/ slip and antiblock | SLEP A w/ PP, slip and antiblock | SLEP B w/ slip and antiblock | SLEP B w/ PP, slip and antiblock | SLEP E w/ Slip and antiblock | SLEP E w/ PP, slip and antiblock |
|---|---|---|---|---|---|---|
| Yield Strength, CD (psi) | 666 | 792 | 829 | 936 | 627 | 808 |
| Yield Strength, MD (psi) | 687 | 907 | 870 | 1099 | 684 | 877 |

*slip = 1250 ppm erucamide slip in SLEP-based concentrate
*antiblock = 2500 ppm White Mist SiO$_2$ antiblock in SLEP-based concentrate
*PP = 10% Profax SR-549M polypropylene copolymer

Example 7

The following data relates to films produced in on a Macro monolayer blown film line at different output rates under different shear rates. The data demonstrate that fabrication conditions influence optics. SLEP F is a 1.0 MI, 0.896 g/cm$^3$ base density, 0.899 finished density substantially linear ethylene/1-octene polymer containing 5000 ppm White Mist antiblock and 2500 ppm erucamide slip. The addition of anti-block to the ethylene polymer caused the haze to be higher than it would have been without the anti-block. The anti-block also increased the density of the polymer, causing the finished density to be 0.003 units higher than the polymer's base density.

The fabrication process utilized a 6 inch die and a 2.5 in. screw. Remaining film fabrication conditions, and resultant physical properties of the films, are set forth in the following table.

| Sample | Polypropylene | wt. % polypropylene | wt. % PA concentrate | wt. % SLEP F | RPM screw | #/hr Output | die gap, mils | die shear rate sec$^{-1}$ | pressure (P4) psi | melt temp (adapter) ° F. | frost line height, in. | Haze, % | clarity |
|---|---|---|---|---|---|---|---|---|---|---|---|---|---|
| 1 | none | 0 | 2 | 98 | 91 | 246.6 | 100 | 81 | 4500 | 441 | 61 | 92 | 89.7 |
| 2 | none | 0 | 2 | 98 | 41 | 107.6 | 30 | 391 | 4200 | 401 | 22 | 5.1 | 91. |
| 3 | Profax 6331 | 8 | 2 | 90 | 136 | 215 | 100 | 70 | 2900 | 442 | 48 | 20 | 35 |
| 4 | Profax 6331 | 8 | 2 | 90 | 48 | 111.2 | 30 | 404 | 3700 | 401 | 23 | 12.8 | 54.5 |
| 5 | Profax SR549M | 8 | 2 | 90 | 141 | 218 | 100 | 71 | 2900 | 441 | 60 | 9 | 89.4 |
| 6 | Profax SR549M | 8 | 2 | 90 | 65 | 110 | 30 | 400 | 3100 | 439 | 20 | 5.4 | 90.4 |
| 7 | Profax 6331 | 12 | 2 | 86 | 140 | 210 | 100 | 69 | 2600 | 442 | 45 | 30 | 23 |
| 8 | Profax 6331 | 12 | 2 | 86 | 48 | 107.4 | 30 | 390 | 3200 | 406 | 19 | 16.5 | 46.4 |
| 9 | Profax SR549M | 12 | 2 | 86 | 157 | 218.5 | 100 | 71 | 2600 | 441 | 61 | 18.5 | 86.1 |
| 10 | Profax SR549M | 12 | 2 | 86 | 66 | 105.4 | 30 | 383 | 2700 | 437 | 17 | 7.1 | 88.3 |
| 15 | Profax SR549M | 12 | 2 | 86 | 6.6 | 113 | 100 | 37 | 2000 | 422 | 16 | 8 | 90 |
| 11 | Profax 6331 | 10 | 2 | 88 | 27 | 72.6 | 30 | 264 | 2800 | 406 | 16 | 9 | 65 |
| 12 | Profax SR549M | 10 | 2 | 88 | 32 | 69.5 | 30 | 252 | 2400 | 439. | 12 | 6 | 89.2 |
| 13 | Profax 6331 | 10 | 2 | 88 | 138 | 212 | 100 | 69 | 2500 | 441 | 45 | 26 | 30 |
| 14 | Profax SR549M | 10 | 2 | 88 | 150 | 215 | 100 | about 70 | 2800 | 441 |  | 9 | 89 |

Although the invention has been described in considerable detail through the preceding examples, this detail is for illustration purposes only, and it is not to be construed as a limitation on the spirit and scope of the invention as described in the following claims.

We claim:
1. A nonperforated film structure suitable for the form/fill/seal packaging of perishable food, comprising at least one film layer which in turn comprises a blend of:
   (a) from 80 to 95 weight percent of at least one homogeneous linear or substantially linear ethylene polymer which is characterized as having:
      (i) a density of from 0.89 to 0.90 g/cm$^3$
      (ii) a molecular weight distribution, $M_w/M_n$, $\leq 3$
      (iii) a single melting peak, as determined by differential scanning calorimetry, and
      (iv) a melt index, $I_2$ when measured in accordance with ASTM D-1238, condition 190° C./2.16 kg, of from 0.5 to 6.0 g/10 minutes; and
   (b) from 5 to 20 weight percent of at least one polypropylene polymer which is homopolymer or copolymer comprising from 93 to 100 weight percent propylene and 0 to 7 weight percent ethylene, and which has a melt flow rate, when measured in accordance with ASTM D-1238, condition 230° C./2.16 kg, of from 6.0 to 25 g/10 min. which is at least four times greater than the melt index, $I_2$ when measured in accordance with ASTM D-1238, condition 190° C./2.16 kg, of component (a); and
   (c) optionally, one or more additives selected from the group consisting of slip, anti-block, polymer process- ing aid, anti-fog, anti-stat, and roll release, which, in total, are present in the blend in an amount less than 10 weight percent;

wherein
- (1) the film structure is characterized as having a haze of less than 3% and, to the extent that the blend includes an additive (c), such additive (c) does not measurably increase the haze of the film structure or (2) the film structure has a haze and the additive (c) increases the haze of the film structure by no more than 10 haze units over the less than 3% haze of a film structure prepared with the blend which does not include the additive (c),
- the film structure is characterized as having a 2% secant modulus which is at least 8% greater than a comparable film structure prepared without component (b),
- the film structure has an oxygen transmission rate of at least 700 cc (at STP)-mil/100 in.$^2$-day-atm at 25° C., and
- the film structure exhibits an oxygen transmission rate at least 25% greater than the oxygen transmission rate of a film consisting of a homogeneous linear or substantially linear ethylene polymer which has the same 2% secant modulus as the blend of (a) and (b).

2. The film structure of claim 1, wherein the homogeneous linear or substantially linear ethylene polymer is an interpolymer of ethylene and at least one $C_3$–$C_{20}$ α-olefin.

3. The film structure of claim 1, wherein the homogeneous linear or substantially linear ethylene polymer is an interpolymer of ethylene and at least one $C_4$–$C_8$ α-olefin.

4. The film structure of claim 1, wherein the homogeneous linear or substantially linear ethylene polymer has a melt index ($I_2$) of from 1 to 3 g/10 min. and the polypropylene polymer has a melt flow rate of 8 to 15 g/10 min.

5. The film structure of claim 1, wherein the polymer (a) is a substantially linear ethylene polymer characterized as having:
- (a) a melt flow ratio, $I_{10}/I_2$, $\geq 5.63$,
- (b) a molecular weight distribution, $M_w/M_n$, defined by the equation: $M_w/M_n \leq (I_{10}/I_2)-4.63$, and
- (c) a critical shear rate at the onset of surface melt fracture of at least 50 percent greater than the critical shear rate at the onset of surface melt fracture of a linear ethylene/α-olefin polymer having about the same $I_2$ and $M_w/M_n$.

6. The film structure of claim 1, wherein the blend comprises from 80 to 90 weight percent of the polymer (a) and from 10 to 20 weight percent of the polymer (b).

7. The film structure of claim 1, wherein the blend comprises 85 to 90 weight percent of the polymer (a) and from 10 to 15 weight percent of the polymer (b).

8. The film structure of claim 1, wherein the film structure is characterized as having a 2% secant modulus which is at least 30% greater than a comparable film structure prepared without component (b).

9. The film structure of claim 1, wherein the film structure is characterized as having a 2% secant modulus which is at least 70% greater than a comparable film structure prepared without component (b).

10. The film structure of claim 1, wherein, to the extent that the blend includes an additive (c), such additive (c) does not measurably increase the haze of the film structure, and wherein the film structure is characterized as having a haze of less than 3%.

11. The film structure of claim 1, wherein the blend includes an additive (c) which increases the haze of the film structure, and wherein the film structure is characterized as having a haze of less than 8%.

12. The film structure of claim 1, wherein the blend includes an additive (c) which increases the haze of the film structure by no more than 10 haze units over that of a film structure prepared with the blend which does not include the additive (c).

13. The film structure of claim 1, in the form of a lid stock for an injection molded, blow molded, or thermoformed tray.

14. The film structure of claim 1, in the form of a modified atmosphere package for packaging fresh fruits, vegetables, legumes, or flowers.

15. The film structure of claim 12, wherein the film structure is characterized as having an oxygen transmission rate of at least 1000 cc (at STP)-mil/100 in.$^2$-day-atm.

16. A highly oxygen transmissive film structure suitable for the packaging of perishable food, comprising at least one film layer which in turn comprises a blend of:
- (a) from 70 to 95 weight percent of at least one homogeneous linear or substantially linear ethylene polymer which is characterized as having:
  - (i) a density of from 0.86 to 0.89 g/cm$^3$
  - (ii) a molecular weight distribution, $M_w/M_n$, $\leq 3$
  - (iii) a single melting peak, as determined by differential scanning calorimetry, and
  - (iv) a melt index, $I_2$, when measured in accordance with ASTM D-1238, condition 190° C./2.16 kg, of from 0.5 to 6.0 g/10 minutes; and
- (b) from 5 to 30 weight percent of at least one polypropylene polymer which is a homopolymer or copolymer comprising from 93 to 100 weight percent propylene and 0 to 7 weight percent ethylene, and having a melt flow rate when measured in accordance with ASTM D-1238, condition 230° C./2.16 kg, of 6 to 25 g/10 min which is at least four times greater than the melt index, $I_2$ when measured in accordance with ASTM D-1238, condition 190° C./2.16 kg, of component (a); and
- (c) optionally, one or more additives selected from the group consisting of slip, anti-block, polymer processing aid, anti-fog, anti-stat, and roll release, which, in total, are present in the blend in an amount less than 10 weight percent;

wherein
- (1) the film structure is characterized as having a haze less than 3% and, to the extent that the blend includes an additive (c), such additive (c) does not measurably increase the haze of the film structure or (2) the film structure has a haze and the additive (c) increases the haze of the film structure by no more than 10 haze units over the less than 3% haze of a film structure prepared with the blend which does not include the additive (c),
- the film structure is characterized as having a 2% secant modulus which is at least 8% greater than a comparable film structure prepared without component (b),
- the film structure has an oxygen transmission rate of at least 1000 cc (at STP)-mil/100 in.$^2$-day-atm at 25° C., and
- the film exhibits an oxygen transmission rate at least 25% greater than the oxygen transmission rate of a film consisting of a homogeneous linear or substantially linear ethylene polymer which has the same 2% secant modulus as the blend of (a) and (b).

17. The film structure of claim 16, wherein the at least one homogeneous linear or substantially linear ethylene polymer is an interpolymer of ethylene and at least one $C_3$–$C_{20}$ α-olefin having a melt index ($I_2$) of from 1 to 3 g/10 min., and wherein the polypropylene polymer has a melt flow rate of 8 to 15 g/10 min.

18. The film structure of claim 16, wherein the polymer (a) is a substantially linear ethylene polymer characterized as having:

(a) a melt flow ratio, $I_{10}/I_2$ 5.63, (b) a molecular weight distribution, $M_w/M_n$, defined by the equation: $M_w/M_n$ ($I_{10}/I_2$)–4.63, and (c) a critical shear rate at the onset of surface melt fracture of at least 50 percent greater than the critical shear rate at the onset of surface melt fracture of a linear ethylene/α-olefin polymer having about the same $I_2$ and $M_w/M_n$.

19. The film structure of claim 16, wherein the blend comprises from 80 to 90 weight percent of the polymer (a) and from 10 to 20 weight percent of the polymer (b).

20. The film structure of claim 16, which includes an additive (c) which increases the haze of the film structure by no more than 10 haze units over that of a film structure prepared with the blend which does not include the additive (c).

21. The film structure of claim 16, wherein the film is characterized as having an oxygen transmission rate of at least 1500 cc (at STP)-mil/100 $in^2$-day-atm.

22. The film structure of claim 16, wherein the film is characterized as having a 2% secant modulus of at least 8000 psi.

* * * * *